US012517465B2

(12) United States Patent
Ren et al.

(10) Patent No.: US 12,517,465 B2
(45) Date of Patent: Jan. 6, 2026

(54) SCREEN PROTECTION CASE FOR AN ELECTRONIC DEVICE

(71) Applicants: Quan Ren, Shenzhen (CN); Quan Zheng, Shenzhen (CN)

(72) Inventors: Quan Ren, Shenzhen (CN); Quan Zheng, Shenzhen (CN)

( * ) Notice: Subject to any disclaimer, the term of this patent is extended or adjusted under 35 U.S.C. 154(b) by 597 days.

(21) Appl. No.: 17/985,922

(22) Filed: Nov. 14, 2022

(65) Prior Publication Data

US 2024/0088932 A1 Mar. 14, 2024

(30) Foreign Application Priority Data

Sep. 8, 2022 (CN) ......................... 202222398919.3

(51) Int. Cl.
*G04B 37/00* (2006.01)

(52) U.S. Cl.
CPC .................................. *G04B 37/005* (2013.01)

(58) Field of Classification Search
CPC .. G04B 37/005; G04B 37/22; G04B 37/0058; G04B 47/042; G04B 37/086; A45C 11/003; G04G 17/00; G04G 17/08
See application file for complete search history.

(56) References Cited

U.S. PATENT DOCUMENTS

| | | | | |
|---|---|---|---|---|
| 5,901,117 A * | 5/1999 | Delabre ............. | G04B 37/0058 368/309 |
| 9,737,123 B2 * | 8/2017 | Wright ................. | A45C 13/008 |
| 11,422,507 B2 * | 8/2022 | Wang ................... | G04B 37/005 |
| 11,947,317 B1 * | 4/2024 | Chen .................... | G04B 37/005 |
| 12,321,139 B2 * | 6/2025 | Liu ...................... | G04B 47/042 |

* cited by examiner

*Primary Examiner* — Edwin A. Leon
(74) *Attorney, Agent, or Firm* — Bayramoglu Law Offices LLC

(57) ABSTRACT

A screen protection case for an electronic device includes a shell, a protection cover, and a sealing ring. The shell is provided with an accommodating space and a window communicating with the accommodating space. The protection cover is transparent, connected to the shell, and covers the window. The sealing ring is attached to a side surface of the protection cover facing the accommodating space. The sealing ring is circumferentially continuous and hollow inside. When the screen protection case accommodates the electronic device in the accommodating space, an edge of the screen of the electronic device is abutted against the sealing ring. The screen protection case effectively reduces the production cost of the screen protection case for the electronic device. The contact area between the sealing ring and the protection cover and the contact area between the sealing ring and the screen are increased.

20 Claims, 6 Drawing Sheets

SCREEN PROTECTION CASE FOR AN ELECTRONIC DEVICE

CROSS REFERENCE TO THE RELATED APPLICATIONS

This application is based upon and claims priority to Chinese Patent Application No. 202222398919.3, filed on Sep. 8, 2022, the entire contents of which are incorporated herein by reference.

TECHNICAL FIELD

The present invention relates to the technical field of screen protection and in particular to a screen protection case for an electronic device.

BACKGROUND

With the development of science and technology, handheld mobile terminals such as smartphones and tablet computers, wearable devices such as smartwatches and smart bracelets, and vehicle-mounted displays are becoming increasingly sophisticated. Specifically, in addition to the basic function of electronic display, these electronic devices also integrate functions such as human-computer interaction, electronic communication, multimedia playing, and photography and video recording. Integrating multiple smart functions requires these electronic devices to be provided with many sophisticated electronic components.

The screen of the electronic device is prone to damage when directly exposed to the environment during use. For example, an electronic device may be accidentally bumped, which increases the risk of damage to the internal sophisticated electronic component. As another example, moisture may easily infiltrate the screen of the electronic device due to being exposed to the environment, thus causing the failure to display normally. The traditional countermeasure is to put the screen of the electronic device in a protection case to reduce the risk of damage and water intake of the wearable devices. The traditional screen protection case has two sealing layers, which are provided on two sides of the screen of the electronic device to prevent outside moisture from infiltrating the screen of the electronic device from two sides of the screen protection case. However, this design significantly increases the production cost of the screen protection case for the electronic device.

SUMMARY

The present invention provides a screen protection case for an electronic device, which solves the problem that a traditional screen protection case with two sealing layers has high costs.

To solve the above technical problem, the present invention adopts the following technical solution:

The present invention provides a screen protection case for an electronic device, including a shell, a protection cover, and a sealing ring. The shell is provided with an accommodating space and a window communicating with the accommodating space. The protection cover is transparent, connected to the shell, and covers the window. The sealing ring is attached to the side surface of the protection cover facing the accommodating space. The sealing ring is circumferentially continuous and hollow inside. When the screen protection case accommodates the electronic device in the accommodating space, an edge of the screen of the electronic device is abutted against the sealing ring.

According to the above technical solution, the embodiment of the present invention has at least the following beneficial effects.

In the embodiment of the present invention, the inner surface of the protection cover is provided with the sealing ring. Therefore, when the screen protection case accommodates the electronic device in the accommodating space, the edge of the screen of the electronic device is abutted against the sealing ring. Two sides of the sealing ring along the thickness direction of the protection cover are pressed against the protection cover and the screen, respectively. The sealing ring effectively prevents water vapor from infiltrating the inside region of the screen and ensures that the inside region of the screen can work normally to display the graphical user interface, thereby improving the sealing and waterproofing level of the inside region of the screen. The technical solution of the present invention does not need to provide another sealing ring between the protection cover and the shell, which simplifies the process and effectively reduces the production cost of the screen protection case for the electronic device. In addition, the present invention provides hollowing of the inside region of the sealing ring, such that when pressed by the screen, the sealing ring can sufficiently deform to the hollow inside region. Thus, the contact area between the sealing ring and the protection cover and the contact area between the sealing ring and the screen are increased, thereby further improving the sealing and waterproofing level of the inside region of the screen.

The present invention further provides a screen protection case for an electronic device, including a shell, a protection cover, and a sealing gasket. The shell is provided with an accommodating space and a window communicating with the accommodating space. The protection cover is transparent, connected to the shell, and covers the window. The sealing gasket is attached to the side surface of the protection cover facing the accommodating space. The sealing gasket is made from transparent material and is spaced apart from an inner side wall of the shell. When the screen protection case accommodates the electronic device in the accommodating space, a middle display region of the screen of the electronic device is abutted against the sealing gasket to allow the sealing gasket to deform radially outward.

According to the above technical solution, the embodiment of the present invention has at least the following beneficial effects.

In the screen protection case for the electronic device according to the embodiment of the present invention, since the outer side of the sealing gasket of the present invention is spaced apart from the shell, when pressed by the screen, the sealing gasket can at least sufficiently deform outward. Thus, the contact area between the sealing gasket and the protection cover and the contact area between the sealing gasket and the screen are increased, thereby further improving the sealing and waterproofing level of the inside region of the screen.

BRIEF DESCRIPTION OF THE DRAWINGS

To more clearly describe the technical solutions in the embodiments of the present invention or in the prior art, the following briefly describes the drawings required for describing the embodiments or the prior art. Apparently, the drawings in the following description show some embodiments of the present invention, and persons of ordinary skill in the art may still derive other drawings from these drawings without creative efforts.

REFERENCE NUMERALS

10. screen protection case; and

20. main body; 21. screen; 100. shell; 101. accommodating space; 102. window; 103. annular groove; 104. opening; 200. protection cover; 210. dispensing groove; 300. sealing ring; 300*a*. sealing gasket; and 400. explosion-proof film.

DETAILED DESCRIPTION OF THE EMBODIMENTS

The typical implementations embodying the features and advantages of the present invention are described in detail below. It should be understood that the present invention may have various changes in different implementations, which do not depart from the scope of the present invention. The description and drawings herein are essentially used for the purpose of explanation, rather than to limit the present invention.

Moreover, the terms such as “first” and “second” are used only for the purpose of description and should not be construed as indicating or implying relative importance or implicitly indicating a quantity of indicated technical features. Therefore, the features defined by “first” and “second” can explicitly or implicitly include one or more features. In the description of the present invention, “multiple” means two or more unless otherwise specifically defined.

In the description of the present invention, it should be noted that, unless otherwise clearly specified, meanings of the terms “install”, “connected with”, and “connected to” should be understood in a broad sense. For example, the connection may be a fixed connection, a removable connection, or an integral connection; a mechanical connection or an electrical connection; a direct connection or an indirect connection by using an intermediate medium; or intercommunication between two components. Those of ordinary skill in the art should understand the specific meanings of the above terms in the present invention based on specific situations.

First Embodiment

Figure 1:
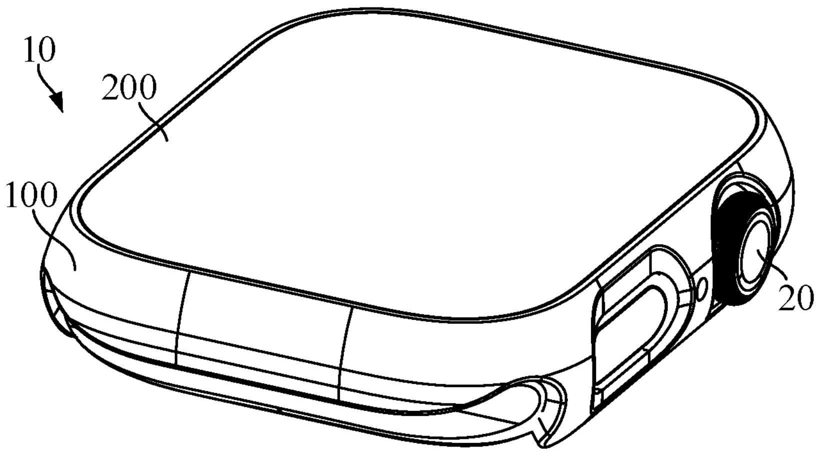
FIG. 1 is a structural view of a screen protection case accommodating an electronic device according to a first embodiment of the present invention.

Referring to FIG. 1, the present invention provides screen protection case 10 for accommodating and protecting main body 20 of a wearable device to prevent the main body 20 from being damaged due to the wearable device falling off from the wearer during use. As shown in FIG. 1, the wearable device is a smartwatch, and the main body 20 is a dial of the smartwatch. It should be understood that, in other embodiments, the wearable device may also be, but is not limited to, a smart wristband or a smart armband. In addition, it should be noted that a wearable device is only a type of electronic device. In other application scenarios, the screen protection case 10 may also accommodate a handheld mobile terminal or a vehicle-mounted display. The handheld mobile terminal may be, but is not limited to, a smartphone, a tablet computer, etc., and the vehicle-mounted display may be a central control display.

In each embodiment of the present invention, the screen protection case 10 can seal and waterproof screen 21 of the electronic device. For ease of understanding, the present invention is described by taking a wearable device as an example.

Figure 2:
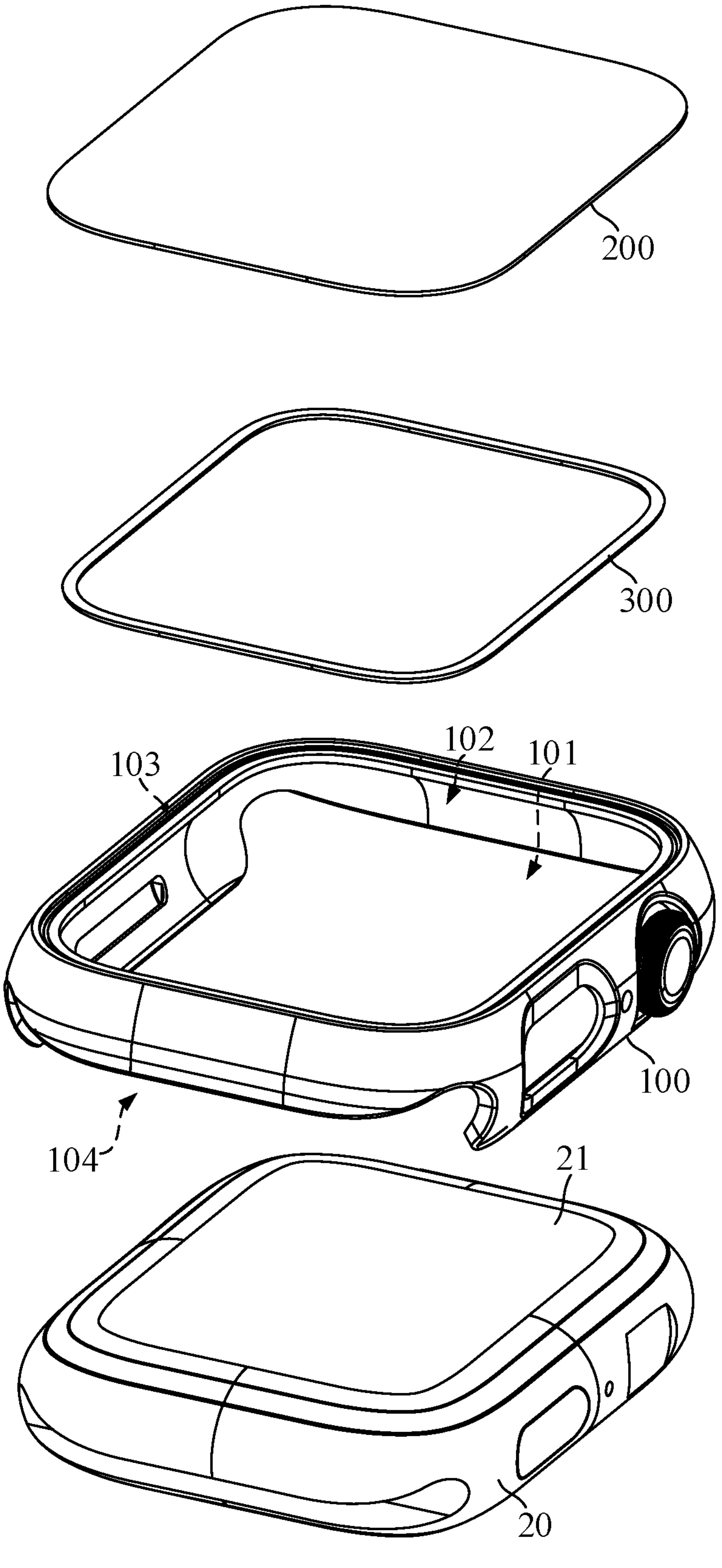
FIG. 2 is an exploded view of the screen protection case and the electronic device (with a screen) shown in FIG. 1.

Referring to FIG. 2, the screen protection case 10 includes shell 100 and protection cover 200. The shell 100 is provided with accommodating space 101 and window 102 communicating with the accommodating space 101. The protection cover 200 is transparent, connected to the shell 100, and covers the window 102. As shown in FIG. 2, the shell 100 is provided with annular groove 103 surrounding the window 102. The annular groove 103 may be provided therein with an adhesive through which the protection cover 200 is adhered to and fixed to the shell 100. The annular groove 103 is circumferentially continuous to ensure the sealing between the protection cover 200 and the shell 100. It can be understood that in other embodiments, the annular groove 103 may be circumferentially discontinuous as long as the protection cover 200 can be adhered to the shell 100. The protection cover 200 may be fixed to the shell 100 by adhering. In addition, the protection cover 200 may also be fixed to the shell 100 in other ways. For example, the protection cover 200 may be snap-fitted with the shell 100.

The protection cover 200 may use any type of tempered film known in the market. The screen protection case 10 can accommodate the main body 20 of the wearable device in the accommodating space 101 and make the screen 21 of the wearable device exposed to the window 102 and face an inner surface of the protection cover 200. In this way, the protection cover 200 can provide high-strength protection to the screen 21 of the wearable device, and the user can interact with the screen 21 through the protection cover 200. It should be noted that, in each embodiment of the present invention, the screen protection case 10 further includes sealing ring 300. The sealing ring 300 is attached to a side surface (i.e., the inner surface) of the protection cover 200 facing the accommodating space 101. The sealing ring 300 must be elastic to achieve the sealing function. The sealing ring 300 is circumferentially continuous and hollow inside. The screen protection case 10 can accommodate the main body 20 in the accommodating space 101 and make an edge of the screen 21 of the main body 20 abut the sealing ring 300 to seal and waterproof an inside region of the screen 21. Specifically, the screen protection case 10 can accommodate the main body 20 in the accommodating space 101 through opening 104.

Figure 3:
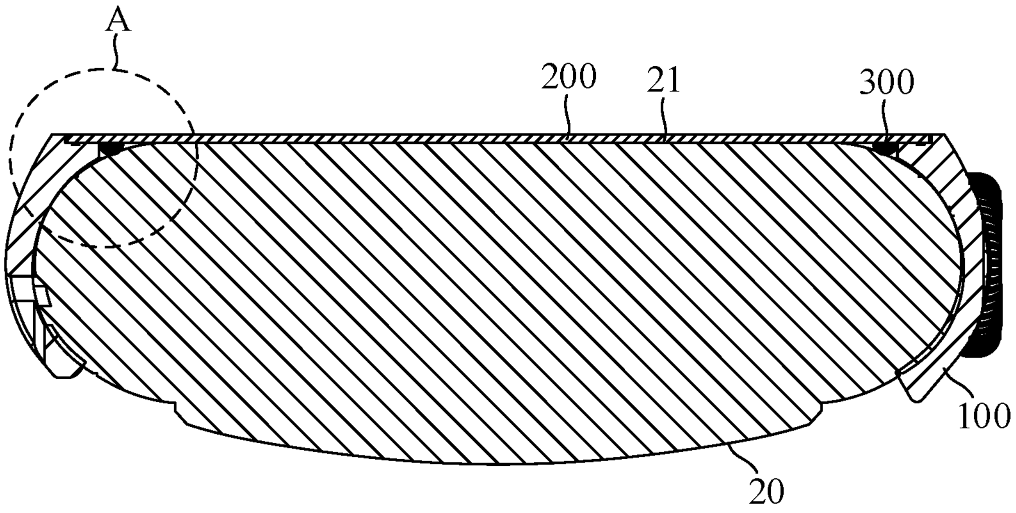
FIG. 3 is a sectional view of the screen protection case and the electronic device shown in FIG. 1.
Figure 4:
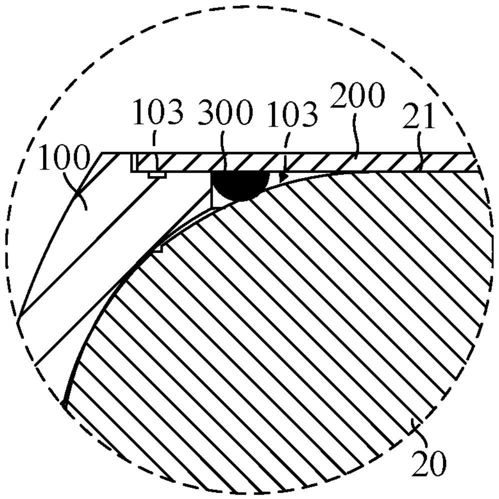
FIG. 4 is an enlarged view of A shown in FIG. 3.

Referring to FIGS. 3 and 4, the sealing ring 300 may be adhered to the inner surface of the protection cover 200 to simplify the production process of the screen protection case 10. In the specific production and assembly process of the screen protection case 10, the sealing ring 300 may be adhered to the inner surface of the protection cover 200 first. Then, the protection cover 200 with the sealing ring 300 is fixed to the shell 100 and covers the window 102, and the sealing ring 300 is accommodated in the window 102. In this embodiment, the sealing ring 300 is formed by curing an adhesive adhered to the inner surface of the protection cover 200. In the specific production process of the screen protection case 10, a circle of adhesive is placed on the inner surface of the protection cover 200 in advance and is then cured to form the sealing ring 300. In this embodiment, the method of fixing the sealing ring 300 does not require the sealing ring 300 to be adhered to the protection cover 200 by another adhesive, thereby simplifying the process. It can be understood that, in other embodiments, without considering the complexity of the process, the adhesive may be cured in advance to form an elastic body, and then the elastic body is adhered to the inner surface of the protection cover 200 by the adhesive. In this case, the finally formed sealing ring 300 includes the elastic body and an adhesive layer. That is, the elastic body is adhered to the inner surface of the protection cover 200 through the adhesive layer.

In the embodiment of the present invention, the inner surface of the protection cover 200 is provided with the sealing ring 300. Therefore, when the screen protection case 10 accommodates the electronic device in the accommodating space 101, the edge of the screen 21 of the electronic device is abutted against the sealing ring 300. Two sides of the sealing ring 300 along the thickness direction of the protection cover 200 are pressed against the protection cover 200 and the screen 21, respectively. The sealing ring 300 effectively prevents water vapor from infiltrating the inside region of the screen 21 and ensures that the inside region of the screen 21 can work normally to display the graphical user interface, thereby improving the sealing and waterproofing level of the inside region of the screen 21. The technical solution of the present invention does not need to provide another sealing ring between the protection cover 200 and the shell 100, which simplifies the process and effectively reduces the production cost of the screen protection case 10 of the electronic device. In addition, the inside region of the sealing ring 300 is hollowed out, such that when pressed by the screen 21, the sealing ring 300 can sufficiently deform to the hollow inside region. Thus, the contact area between the sealing ring 300 and the protection cover 200 and the contact area between the sealing ring 300 and the screen 21 are increased. The design further improves the sealing and waterproofing level of the inside region of the screen 21 and effectively ensures the normal display of the interface in the inside region of the screen 21. Compared with a whole sealing piece provided between the protection cover 200 and the screen 21, on the one hand, the present invention can save the consumable material of the sealing ring 300, on the other hand, the middle hollowed-out sealing ring 300 can deform toward the inside region, and thus the contact between the sealing ring 300 and the screen 21 is closer after the sealing ring 300 is extruded and deformed. As for the sealing piece, since there is no space for deformation, after the sealing piece is pressed, the surface of the sealing piece will wrinkle and bulge, and a lot of irregular gaps may exist between the sealing piece and the screen 21, resulting in poor sealing.

Referring to FIG. 4, the outer side of the sealing ring 300 is in contact with the inner side wall of the shell 100, and the sealing ring 300 is seamlessly connected to the inner side wall of the shell 100. In this way, when the main body 20 of the electronic device is accommodated in the accommodating space 101, the sealing ring 300 is abutted between the protection cover 200 and the edge of the screen 21 to seal the inside region of the screen 21. In addition, the sealing ring 300 is also abutted between the protection cover 200 and the shell 100 to seal the accommodating space 101. This design at least prevents water vapor from the side of the protection cover 200 from infiltrating into the accommodating space 101 and prevents the main body 20 of the electronic device from being corroded and damaged due to the water vapor.

Second Embodiment

Figure 5:
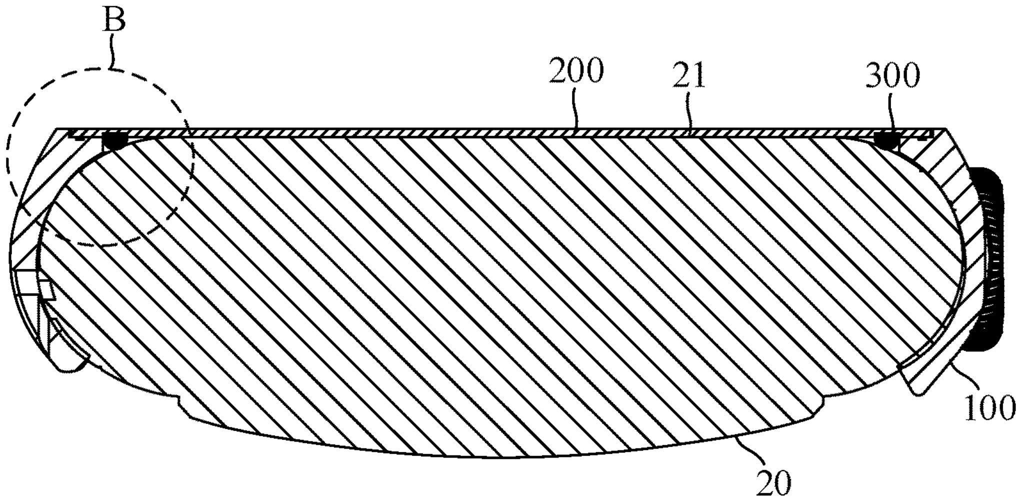
FIG. 5 is a sectional view of a screen protection case accommodating an electronic device according to a second embodiment of the present invention.
Figure 6:
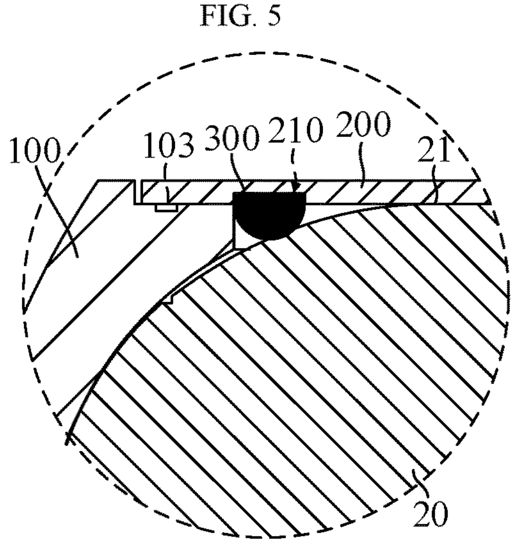
FIG. 6 is an enlarged view of B shown in FIG. 5.

Referring to FIGS. 5 and 6, FIG. 5 is a sectional view of the screen protection case 10 and the main body 20 of the electronic device according to the second embodiment, and FIG. 6 is an enlarged view of B shown in FIG. 5.

The screen protection case 10 of this embodiment has substantially the same structure as the screen protection case 10 of the first embodiment, but the connection structure of the sealing ring 300 and the protection cover 200 of this embodiment is different. In this embodiment, the protection cover 200 is provided with circumferentially continuous dispensing groove 210. The sealing ring 300 is partially embedded in the dispensing groove 210 and partially protrudes from the dispensing groove 210. A portion of the sealing ring 300 protruding from the dispensing groove 210 is in contact with the screen 21 of the electronic device. It should be noted that, before the sealing ring 300 is formed by the adhesive, the dispensing process can be positioned through the dispensing groove 210 to ensure the accuracy of manual dispensing on the back of the protection cover 200. On the other hand, the dispensing groove 210 can also ensure the strength of the combination of the sealing ring 300 and the protection cover 200, at least ensuring that the main body 20 will not misplace the sealing ring 300 after the main body 20 is installed in the accommodating space 101.

Third Embodiment

Figure 7:
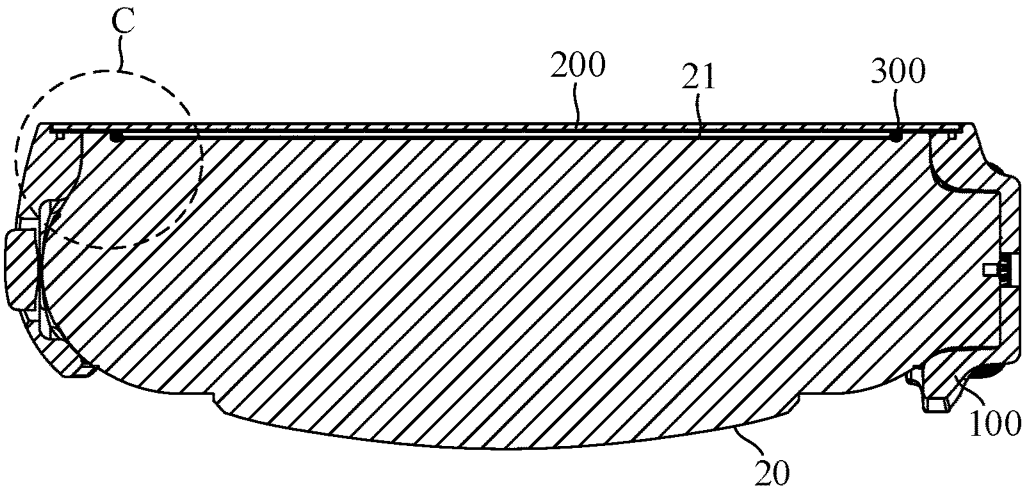
FIG. 7 is a sectional view of a screen protection case accommodating an electronic device according to a third embodiment of the present invention.
Figure 8:
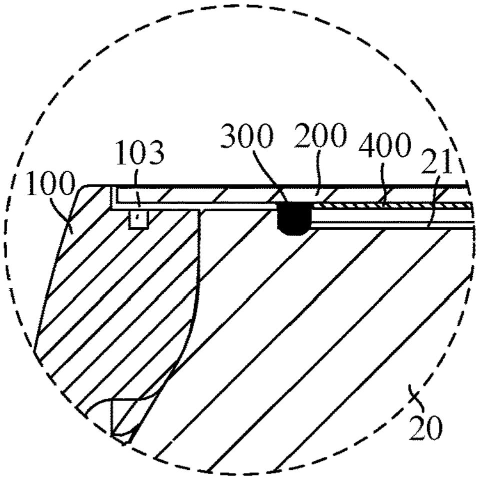
FIG. 8 is an enlarged view of C shown in FIG. 7.

Referring to FIGS. 7 and 8, FIG. 7 is a sectional view of the screen protection case 10 and the main body 20 of the electronic device according to the third embodiment, and FIG. 8 is an enlarged view of C shown in FIG. 7.

The screen protection case 10 of this embodiment has substantially the same structure as the screen protection case 10 of the first embodiment, but the position of the sealing ring 300 of this embodiment is different. In this embodiment, the outer side of the sealing ring 300 is spaced apart from the inner side wall of the shell 100, such that the sealing ring 300 can also deform radially outward when it is pressed. That is, the sealing ring 300 can deform radially outward and radially inward when pressed. In this way, the contact area between the sealing ring 300 and the protection cover 200 and the contact area between the sealing ring 300 and the screen 21 are increased, thereby further enhancing the sealing performance of the sealing ring 300 to the inside region of the screen 21. It should be understood that since the outer side of the sealing ring 300 is spaced apart from the inner side wall of the shell 100, an avoidance space may also be provided. Especially for the main body 20 of some type of electronic device, the avoidance space may be provided for part of the main body 20 to pass through.

In this embodiment, the hollow inside region of the sealing ring 300 is provided with explosion-proof film 400. The explosion-proof film 400 is attached to the inner surface of the protection cover 200. A side of the explosion-proof film 400 facing away from the protection cover 200 does not protrude from a side of the sealing ring 300 facing away from the protection cover 200 to avoid affecting the abutment contact between the sealing ring 300 and the main body 20. It should be understood that the design of the explosion-proof film 400 provided in the hollow region of the sealing ring 300 is also applicable to the first embodiment.

Fourth Embodiment

Figure 9:
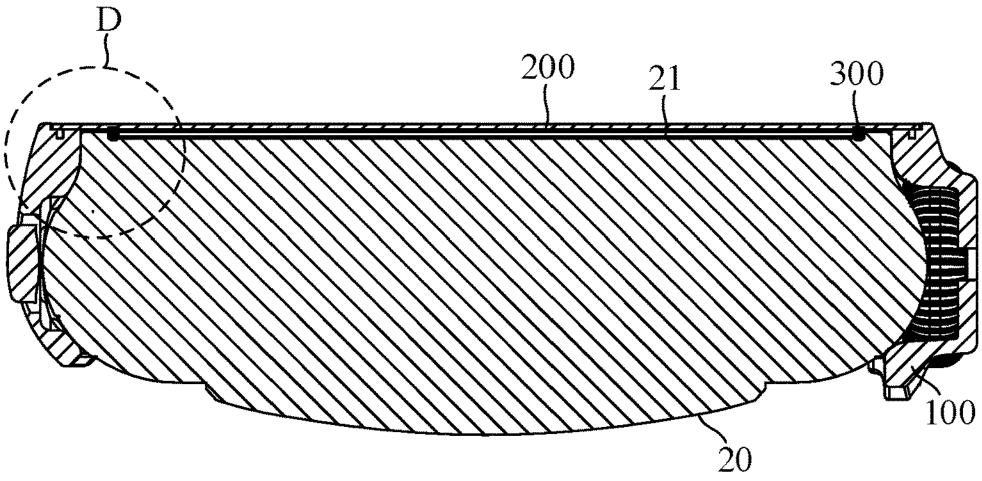
FIG. 9 is a sectional view of a screen protection case accommodating an electronic device according to a fourth embodiment of the present invention.
Figure 10:
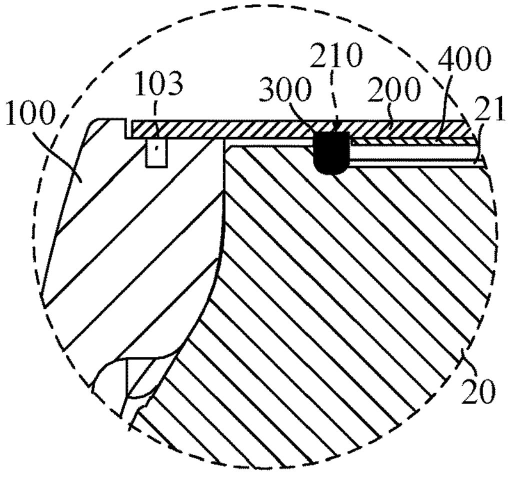
FIG. 10 is an enlarged view of D shown in FIG. 9.

Referring to FIGS. 9 and 10, FIG. 9 is a sectional view of the screen protection case 10 and the main body 20 of the electronic device according to the fourth embodiment, and FIG. 10 is an enlarged view of D shown in FIG. 9.

The screen protection case 10 of this embodiment has substantially the same structure as the screen protection case 10 of the third embodiment, but the connection structure of the sealing ring 300 and the protection cover 200 of this embodiment is different. In this embodiment, the protection cover 200 is provided with circumferentially continuous dispensing groove 210. The sealing ring 300 is partially embedded in the dispensing groove 210 and partially protrudes from the dispensing groove 210. A portion of the sealing ring 300 protruding from the dispensing groove 210 is in contact with the screen 21 of the electronic device. It should be noted that, before the sealing ring 300 is formed by the adhesive, the dispensing process can be positioned through the dispensing groove 210 to ensure the accuracy of manual dispensing on the back of the protection cover 200. On the other hand, the dispensing groove 210 can also ensure the strength of the combination of the sealing ring 300 and the protection cover 200, at least ensuring that the main body 20 will not misplace the sealing ring 300 after the main body 20 is installed in the accommodating space 101.

Fifth Embodiment

Figure 11:
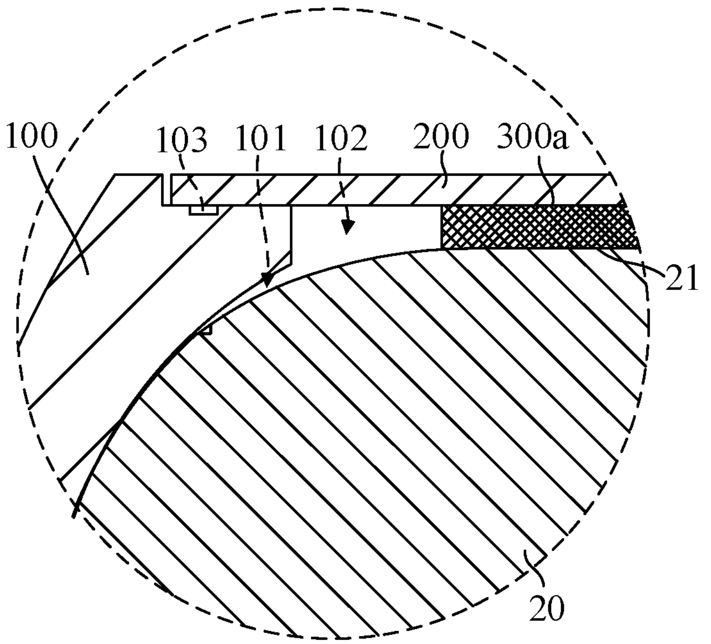
FIG. 11 is a partial sectional view of a screen protection case accommodating an electronic device according to a fifth embodiment of the present invention.

Referring to FIG. 11, FIG. 11 is a sectional view of the screen protection case 10 and the main body 20 according to the fifth embodiment.

The screen protection case 10 of this embodiment has substantially the same structure as the screen protection case 10 of the first embodiment, but the connection position of the sealing ring 300 and the protection cover 200 of this embodiment is different. In this embodiment, the sealing ring 300 is replaced by the sealing gasket 300*a*. The sealing gasket 300*a* in this embodiment is made from transparent material and is spaced apart from the inner side wall of the shell 100. The sealing gasket 300*a* may be made from polyethylene terephthalate (PET) material, and the PET material has good mechanical properties, good impact strength, good folding resistance and high transparency. Of course, the sealing gasket 300*a* may also be made from other transparent flexible materials. Based on the transparent material of the sealing gasket 300*a*, the sealing gasket 300*a* can completely cover the inside region of the screen protection case 10, and the sealing gasket 300*a* can allow the light emitted by the screen 21 to pass through to display the screen interface normally. The screen protection case 10 can accommodate the main body 20 in the accommodating space 101, make the middle display region of the screen 21 of the main body 20 abut the sealing gasket 300*a* and make the sealing gasket 300*a* deform radially outward.

Since an avoidance area is formed between the transparent sealing gasket 300*a* and the shell 100 that are spaced apart from each other, the sealing gasket 300*a* can also deform radially outward when it is pressed. That is, the sealing gasket 300*a* can deform radially outward when pressed. In this way, the contact area between the sealing gasket 300*a* and the protection cover 200 and the contact area between the sealing gasket 300*a* and the screen 21 are increased, thereby further enhancing the sealing performance of the sealing gasket 300*a* to the inside region of the screen 21. It should be understood that the avoidance space between the sealing gasket 300*a* and the shell 100 may be provided for part of the main body 20 of some type of electronic device to pass through.

It should be noted that the specific installation form of the sealing gasket 300*a* of this embodiment can refer to the introduction of the installation form of the sealing ring 300 in the first embodiment, which will not be repeated herein.

The present invention is described above with reference to some typical implementations. It should be understood that the terms used herein are intended for illustration, rather than limiting the invention. The present invention may be specifically implemented in many forms without departing from the spirit or essence of the present invention. Therefore, it should be understood that the above embodiments are not limited to any of the above-mentioned details but should be broadly interpreted according to the spirit and scope defined by the appended claims. Therefore, any changes and modifications falling within the claims or the equivalent scope thereof should be covered by the appended claims.

What is claimed is:

1. A screen protection case for an electronic device, comprising a shell, a protection cover, and a sealing ring, wherein the shell is provided with an accommodating space and a window communicating with the accommodating space; the protection cover is transparent, connected to the shell, and covers the window; the sealing ring is attached to a side surface of the protection cover, wherein the side surface of the protection cover faces the accommodating space; the sealing ring is circumferentially continuous and hollow inside; and when the screen protection case accommodates the electronic device in the accommodating space, an edge of a screen of the electronic device is abutted against the sealing ring.

2. The screen protection case for the electronic device according to claim 1, wherein the sealing ring is adhered to the protection cover.

3. The screen protection case for the electronic device according to claim 2, wherein the sealing ring comprises an elastic body and an adhesive layer, wherein the elastic body is adhered to the protection cover through the adhesive layer.

4. The screen protection case for the electronic device according to claim 2, wherein the sealing ring is formed by curing an adhesive adhered to an inner surface of the protection cover.

5. The screen protection case for the electronic device according to claim 4, wherein the protection cover is provided with a circumferentially continuous dispensing groove, and the sealing ring is partially embedded in the circumferentially continuous dispensing groove.

6. The screen protection case for the electronic device according to claim 1, wherein an outer side of the sealing ring is in contact with an inner side wall of the shell, and the sealing ring is seamlessly connected to the shell.

7. The screen protection case for the electronic device according to claim 1, wherein an outer side of the sealing ring is spaced apart from an inner side wall of the shell, such that the sealing ring deforms radially outward when pressed.

8. The screen protection case for the electronic device according to claim 1, wherein a hollow inside region of the sealing ring is provided with an explosion-proof film, and the explosion-proof film is attached to an inner surface of the protection cover; and a side of the explosion-proof film does not protrude from a side of the sealing ring, wherein the side of the explosion-proof film faces away from the protection cover, and the side of the sealing ring faces away from the protection cover.

9. The screen protection case for the electronic device according to claim 1, wherein the shell is provided with an annular groove surrounding the window; the screen protection case further comprises an adhesive, wherein the adhesive is provided in the annular groove; and the protection cover is adhered to and fixed to the shell through the adhesive.

10. The screen protection case for the electronic device according to claim 1, wherein the screen protection case is a screen protection case for a handheld mobile terminal.

11. The screen protection case for the electronic device according to claim 1, wherein the screen protection case is a screen protection case for a wearable device.

12. The screen protection case for the electronic device according to claim 1, wherein the screen protection case is a screen protection case for a vehicle-mounted display.

13. A screen protection case for an electronic device, comprising a shell, a protection cover, and a sealing gasket, wherein the shell is provided with an accommodating space and a window communicating with the accommodating space; the protection cover is transparent, connected to the shell, and covers the window; the sealing gasket is attached to a side surface of the protection cover facing the accommodating space; the sealing gasket is made from transparent material and is spaced apart from an inner side wall of the shell; and when the screen protection case accommodates the electronic device in the accommodating space, a middle display region of the screen of the electronic device is abutted against the sealing gasket to allow the sealing gasket to deform radially outward.

14. The screen protection case for the electronic device according to claim 13, wherein the sealing gasket is adhered to the protection cover.

15. The screen protection case for the electronic device according to claim 14, wherein the sealing gasket comprises an elastic body and an adhesive layer, wherein the elastic body is adhered to the protection cover through the adhesive layer.

16. The screen protection case for the electronic device according to claim 14, wherein the sealing gasket is formed by curing an adhesive adhered to an inner surface of the protection cover.

17. The screen protection case for the electronic device according to claim 16, wherein an inside region of the protection cover is recessed inward to form a dispensing groove, and the sealing gasket is partially embedded in the dispensing groove.

18. The screen protection case for the electronic device according to claim 13, wherein the screen protection case is a screen protection case for a handheld mobile terminal.

19. The screen protection case for the electronic device according to claim 13, wherein the screen protection case is a screen protection case for a wearable device.

20. The screen protection case for the electronic device according to claim 13, wherein the screen protection case is a screen protection case for a vehicle-mounted display.

* * * * *